United States Patent
Takano et al.

[11] Patent Number: 5,949,234
[45] Date of Patent: Sep. 7, 1999

[54] ELECTROSTATIC SENSOR

[75] Inventors: Osamu Takano; Hitoshi Ito, both of Yotsukaido, Japan

[73] Assignee: SEIKO Precision Inc., Japan

[21] Appl. No.: 08/588,550

[22] Filed: Jan. 18, 1996

[30] Foreign Application Priority Data

Jan. 19, 1995 [JP] Japan .................................. 7-006511

[51] Int. Cl.$^6$ ................................................ G01R 29/12
[52] U.S. Cl. .......................... 324/452; 324/662; 324/690
[58] Field of Search ..................... 324/662, 663, 324/671, 457, 452, 660, 661, 690, 686

[56] References Cited

U.S. PATENT DOCUMENTS

| | | | |
|---|---|---|---|
| 1,924,687 | 8/1933 | Allen | 324/671 |
| 2,892,152 | 6/1959 | Buisson | 324/671 |
| 4,290,065 | 9/1981 | Gleason | 324/662 |
| 4,546,645 | 10/1985 | Delmulle | 324/690 |
| 4,720,682 | 1/1988 | Ikushima | 324/457 |
| 4,947,131 | 8/1990 | Mayer | 324/671 |
| 5,134,379 | 7/1992 | Maher | 324/690 |
| 5,266,903 | 11/1993 | Foster | 324/662 |
| 5,291,124 | 3/1994 | Hoffman | 324/156 |

FOREIGN PATENT DOCUMENTS

| | | | |
|---|---|---|---|
| 0313071 | 12/1988 | Japan | 324/156 |
| 0044572 | 2/1991 | Japan | 324/663 |
| 2260407 | 4/1993 | United Kingdom | 324/663 |

*Primary Examiner*—Maura Regan
*Attorney, Agent, or Firm*—Adams & Wilks

[57] ABSTRACT

An electrostatic sensor comprises a ground electrode defining an enclosure having a through-hole for permitting the passage of a body therethrough. A sensor electrode is disposed in the ground electrode. A detecting circuit is disposed in the ground electrode for detecting the passage of the body through the through-hole on the basis of a change in an electrostatic capacitance between the ground electrode and the sensor electrode.

16 Claims, 3 Drawing Sheets

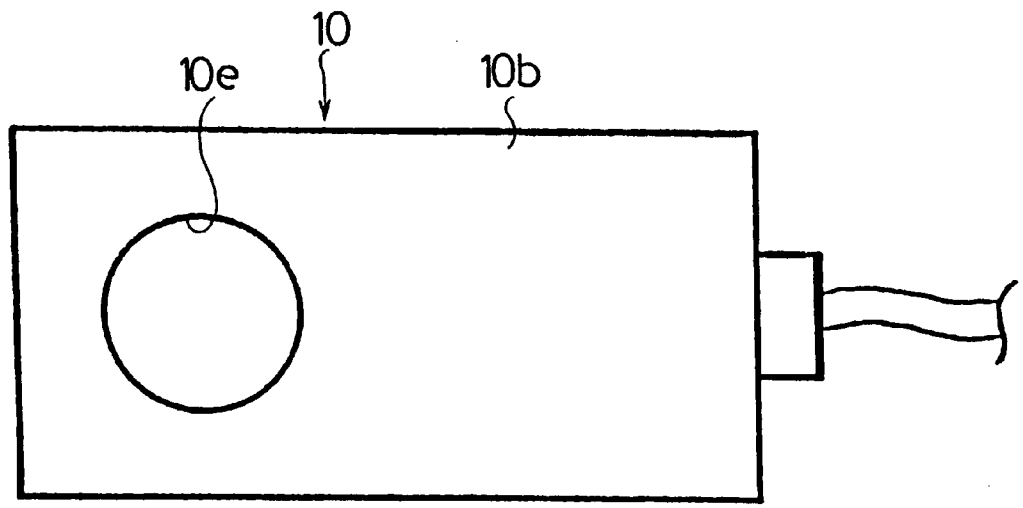
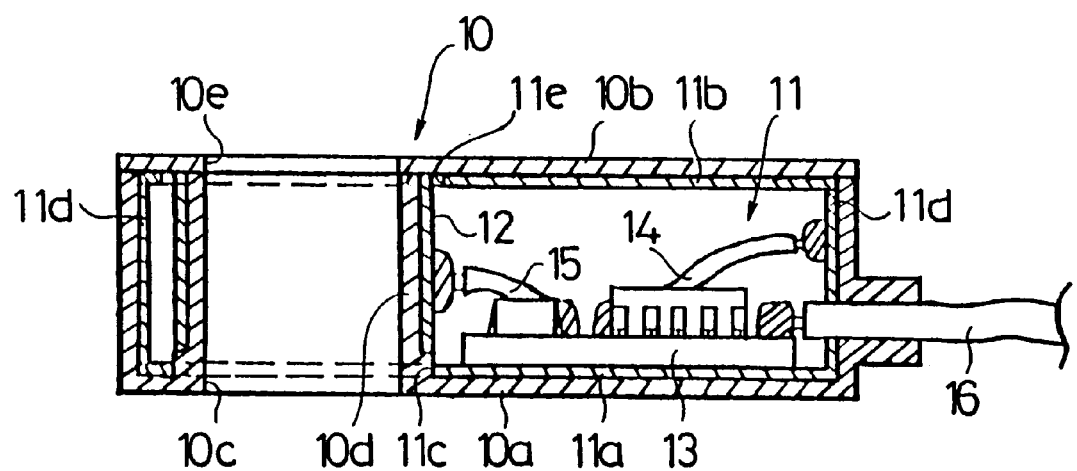

ELECTROSTATIC SENSOR

FIELD OF THE INVENTION

The present invention relates to an electrostatic sensor having a sensor electrode and a ground electrode for detecting passage of a body based on a change in an electrostatic capacitance between both electrodes.

BACKGROUND OF THE INVENTION

There is a high-oscillation type sensor for detecting passage of a body in which a detecting coil is provided at the surrounding of a portion of the sensor through which a body passes and which detects the passage of a body based on a change in the inductance of the detection coil caused by the passage of the body. However, in this case the material of the body to be detected is limited to a metal and the passage of a nonmetallic body such as those made of plastics or wood cannot be detected. Accordingly, it comes to ones mind to detect the passage of a body irrespective of the material by using an electrostatic sensor of an electrostatic capacitance type.

For example, a through hole 2 that is passable by a body is formed in a box-like case 1 as shown in FIG. 5. At the inside of the case 1 a sensor electrode 3 and a ground electrode 4 are installed in an opposed state apart from each other by a predetermined distance such that the body can pass therebetween through the through hole 2. Along with them a sensor circuit board 5 is disposed at the inner portion of the case 1 and the passage of the body is detected by a detecting circuit of the sensor circuit board 5 based on a change in an electrostatic capacitance between the sensor electrode 3 and the ground electrode 4.

However, in the above-mentioned electrostatic sensor the sensor electrode 3 and the ground electrode 4 are opposed and apart from each other by a predetermined distance such that the body is allowed to pass therebetween through the through hole 2. Therefore, in view of the structure a wide effective area of the sensor electrode 3 cannot be provided and accordingly, the detectable distance is short. Especially, when the body is small, or the like, the passage of the body cannot be detected. Further, the sensor electrode 3 is likely to operate erroneously by being influenced by outside noises and the erroneous operation by outside noises must be prevented by providing a special member around the sensor electrode 3.

SUMMARY OF THE INVENTION

It is an object of the present invention to provide an electrostatic sensor capable of firmly detecting the passage of a body even if the body is small and preventing erroneous operation due to outside noises without installing a special member.

The present invention provides an electrostatic sensor having a ground electrode and a sensor electrode for detecting passage of a body based on a change in an electrostatic capacitance between both electrodes. The feature of the present invention lies in that the ground electrode is formed in a case-like shape having a through hole that is passable by the body and the sensor electrode is formed in a cylindrical shape and disposed at the interior portion of the ground electrode so that the body can pass through the inside of the sensor electrode.

It is preferable to install a sensor circuit board incorporating a detecting circuit which detects the passage of the body based on the change in the electrostatic capacitance between the sensor electrode and the ground electrode.

BRIEF DESCRIPTION OF DRAWINGS

FIG. 1 is a plane view of an outlook of an electrostatic sensor according to the present invention;

FIG. 2 is a longitudinal sectional view showing an internal structure of a case;

DETAILED DESCRIPTION OF THE PREFERRED EMBODIMENT

An explanation will be given of an electrostatic sensor according to the present invention with reference to the drawings as follows.

Figure 3:
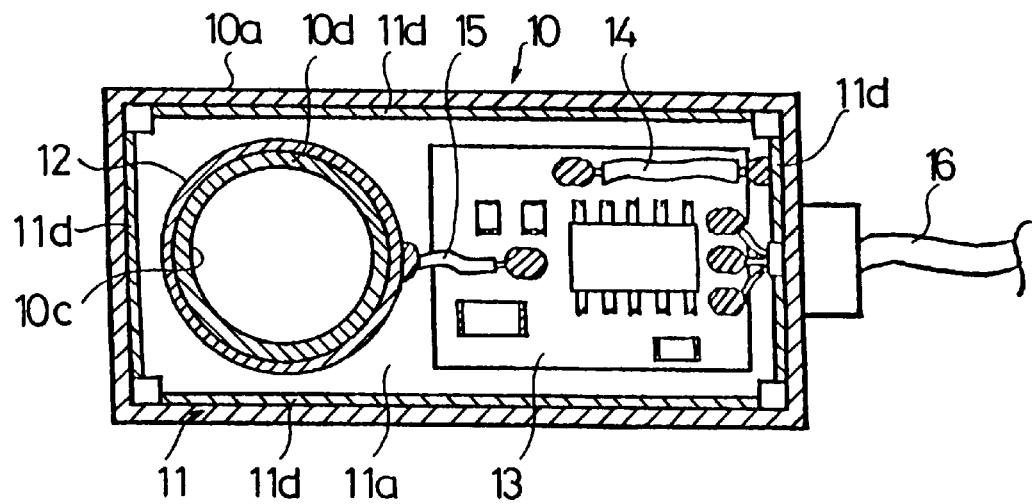
FIG. 3 is a cross sectional view showing the internal structure of the case.
Figure 4:
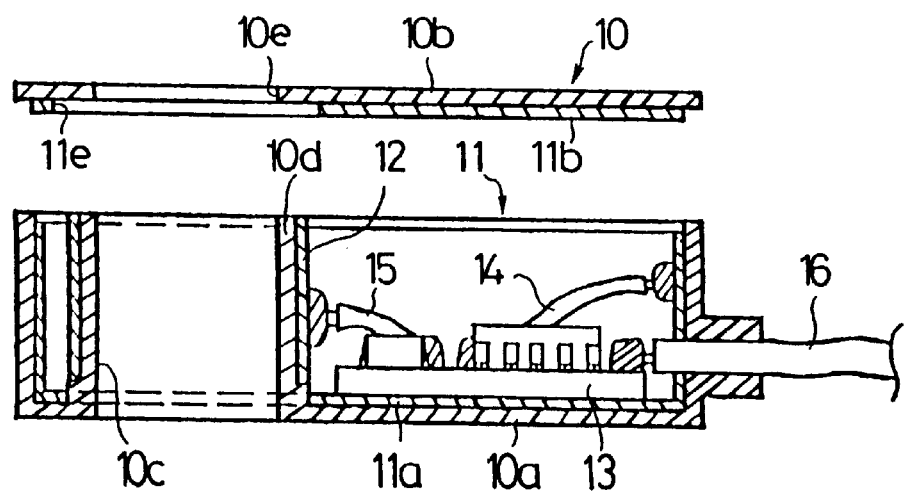
FIG. 4 is a longitudinal sectional view showing the electrostatic sensor of which the upper case is removed.
Figure 5:
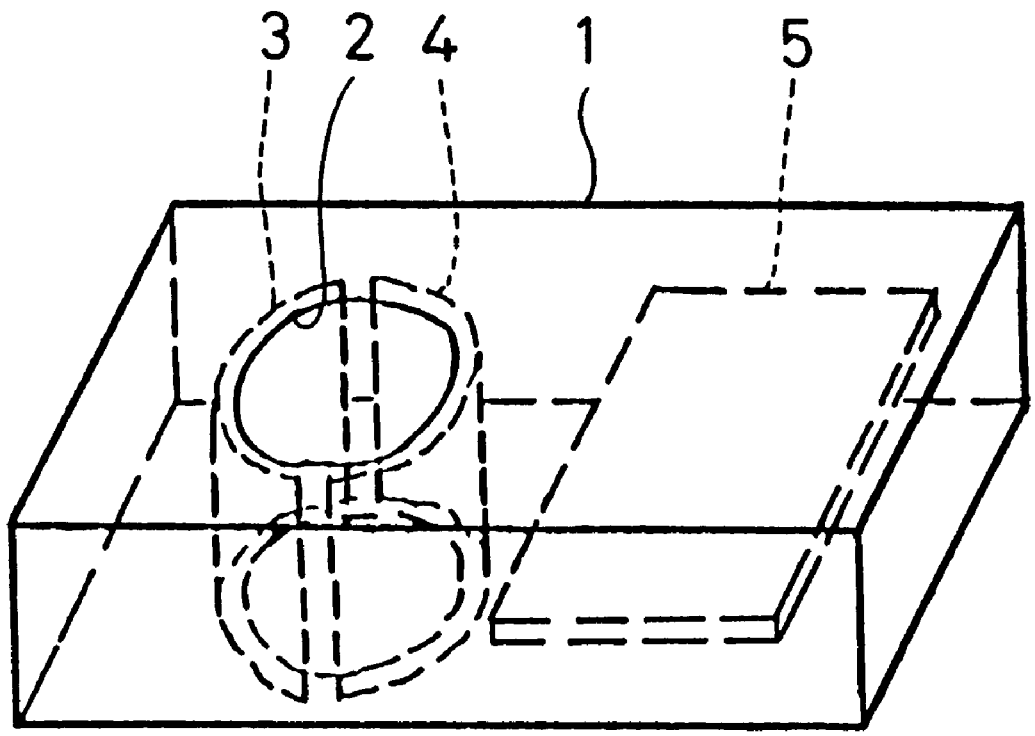
FIG. 5 is a perspective view showing a conventional electrostatic sensor structure.

In the electrostatic sensor a housing or case 10 having a rectangular box shape is provided as shown in FIG. 1 through FIG. 3 and a ground electrode 11, a sensor electrode 12 and a sensor circuit board 13 are installed inside of the case 10.

The case 10 is made of an insulating material such as plastics and is constituted by a lower case 10a having a rectangular box shape of which top face is open and an upper case 10b in a cover plate shape covering the upper face opening of the lower case 10a. At the bottom wall of the lower case 10a a cylindrical portion 10d having a through hole 10c is protruded and the height of protrusion of the cylindrical portion 10d is substantially the same as those of the side walls of the lower case 10a. The upper case 10b is attachably and detachably integrated to the lower case 10a by screws or the like which is removable as necessary and in which a through hole 10e to be located concentrically with the through hole 10c is formed. Both of the through hole 10c and the through hole 10e are in sizes passable by a body.

The ground electrode 11 defines on enclosure formed in a case-like shape and is arranged on the inner faces of the case 10 along the outside configuration of the case 10 through which a body is allowed to pass with the cylindrical portion 10d of the case 10 as a guide. That is, the ground electrode 11 is constituted by a first electrode 11a bonded and fixed on the inner face of the bottom wall of the lower case 10a and a second electrode 11b bonded and fixed on the inner face of the upper case 11b. In the first electrode 11a a through hole 11c through which the base of the cylindrical portion 10d passes is formed and wall portions 11d erecting along the respective side walls of the lower case 10a are formed around the through hole 10c. The wall portions lid are brought into contact with the second electrode 11b at their distal ends. In the second electrode 11b a through hole lie through which the distal end of the cylindrical portion 10d passes is formed and a body can pass through the through holes 11c and 11e with the cylindrical portion 10d of the case 10 as a guide.

The sensor electrode 12 is formed in a cylindrical shape and is fitted to the outer periphery of the cylindrical portion 10d of the case 10 and is installed at the interior portion of the ground electrode 11 such that a body can pass through the inside of the sensor through the through holes 11c and lie of the ground electrode 11 with the cylindrical portion 10d of the case 10 as a guide. The sensor electrode 12 and the ground electrode 11 are apart from each other by predetermined distances. That is, the lower end of the sensor electrode 12 is located a little above the base of the cylindrical portion 10d and the sensor electrode 12 and the first electrode 11a are apart from each other by a predetermined distance. Further, the through hole 11e of the second electrode 11b is formed larger than the outer diameter of the sensor electrode 12 and the sensor electrode 12 and the second electrode 11b are apart from each other by a predetermined distance.

The sensor circuit board 13 is attached to the inner face of the first electrode 11a of the ground electrode 11 by a fixing means, not shown, such that the board is disposed at a side of the sensor electrode 12 and installed at the inner portion of the ground electrode 11 along with the sensor electrode 12. The sensor circuit board 13 is connected to the ground electrode 11 via a wiring cable 14 and is connected to the sensor electrode 12 via a wiring cable 15 and an input/output cable 16 is connected thereto. The input/output cable 16 penetrates through one of the wall portions 11d and the lower case 10a and is led to the outside of the case 10. The input/output cable 16 is provided with a predetermined number of leads and is connected to a power source and a control device, not shown, at the outside of the case 10 via the leads.

A detecting circuit is built in the sensor circuit board 13. A detect instruction signal is inputted to the detecting circuit from a control device, not shown, via the input/output cable 16. Upon receiving the detect instruction signal the circuit detects the passage of a body based on a change in an electrostatic capacitance between the sensor electrode 12 and the ground electrode 11 when the body passes through the inside of the sensor electrode 12 by passing through the through holes 11c and lie of the ground electrode 11 with the cylindrical portion 10d of the case 10 as a guide and outputs the detection signal to a control device, not shown, via the input/output cable 16.

Next, an explanation will be given of the operation.

When the case 10 is disposed on a passage of a body such that the body passes through the through holes 10c and 10e of the case 10, the body is allowed to pass through the inside of the sensor electrode 12 via the though holes 11c and 11e of the ground electrode 11. When the detect instruction signal is inputted from a control device, not shown, to the detecting circuit of the sensor circuit board 13 under such an arrangement, the passage of the body is detected based on the change in the electrostatic capacitance between the sensor electrode 12 and the ground electrode 11 by the detecting circuit of the sensor circuit board 13 when the body passes through the inside of the sensor electrode 12 through the through holes 11c and 11e with the cylindrical portion 10d of the case 10 as a guide and the detection signal is outputted to a control device, not shown, via the input/output cable 16.

Further, in detecting the body the ground electrode 11 is formed in a case-like shape having the through holes 11c and 11e passable by the body and the sensor electrode 12 is formed in a cylindrical shape and is installed at the interior portion of the ground electrode 11 through which the body can pass. Therefore, a wide effective area of the sensor electrode 12 is provided and a sufficient detection distance is provided by which the passage of the body can firmly be detected even if the body is small, or the like and erroneous operation by outside noises can be prevented without providing a special member since the sensor electrode 12 is covered by the ground electrode 11.

Further, the sensor circuit board 13 along with the sensor electrode 12 are installed at the interior portion of the ground electrode 11 and accordingly, the sensor circuit board 13 along with the sensor electrode 12 are covered by the ground electrode by which the erroneous operation by outside noises can more firmly be prevented.

Although in the above embodiment the first electrode 11a and the second electrode 11b of the ground electrode 11 are made conductive by bringing the distal ends of the wall portions 11d of the first electrode 11a and the second electrode 11b into contact with each other, the wall portions 11d of first electrode 11a and the second electrode 11b may be constituted such that gaps are produced between the distal ends of the wall portions 11d of the first electrode 11a and the second electrode 11b and the both may be made conductive via leads or the like.

Although in the above embodiment the ground electrode 11 is formed in a case-like shape by two members of the first electrode 11a and the second electrode 11b, the ground electrode 11 may be formed in a case-like shape integrally by a single member.

Although in the above embodiment the cylindrical portion 10d is formed in the case 10 and the body passes through the inside of the sensor electrode 12 through the through holes 11c and 11e of the ground electrode 11 with the cylindrical portion as a guide, the cylindrical portion 10d may be omitted, the cylindrical sensor electrode 12 may be erected on the inner face of the bottom wall of the case 10 without being brought into contact with the ground electrode 11 and the body may pass directly through the inside of the sensor electrode 12 via the through holes 11c and 11e of the ground electrode 11.

Although in the above embodiment the sensor circuit board 13 is arranged at side of sensor electrode 12, both may be arranged such that the sensor electrode 12 penetrates the sensor circuit board 13.

As has been explained, according to the electrostatic sensor of the present invention, the ground electrode is formed in a case-like shape having a through hole that is passable by a body and the sensor electrode is formed in a cylindrical shape and is installed at the interior portion of the ground electrode such that the body is allowed to pass through the inside. Therefore, a wide effective area of the sensor electrode is provided and a sufficient detection distance is provided by which the passage of the body can firmly be detected even if the body is small, or the like. Furthermore, the sensor electrode is covered by the ground electrode and erroneous operation by outside noises can be prevented without installing a special member.

Further, when the sensor circuit board is installed at the inner portion of the ground electrode, the sensor circuit board along with the sensor electrode are covered by the ground electrode and erroneous operation by outside noises can effectively be prevented.

What is claimed is:

1. An electrostatic sensor comprising:
    a ground electrode having a case-like shape and having a through-hole through which a body can pass;
    a sensor electrode having a cylindrical shape and being disposed at an interior portion of the ground electrode such that the body passes through an inside of the sensor electrode; and
    a sensor circuit board installed at the interior portion of the ground electrode, the sensor circuit board having a detecting circuit for detecting the passage of the body based on the change in the electrostatic capacitance between the sensor electrode and the ground electrode.

2. An electrostatic sensor comprising: a first electrode defining an enclosure having a through-hole for permitting the passage of a body therethrough; a second electrode disposed in the first electrode; a detecting device having a detecting circuit disposed in the first electrode for detecting the passage of the body through the through-hole on the basis of a change in an electrostatic capacitance between the first electrode and the second electrode; and a housing containing therein the first and second electrodes and the detecting circuit, the first electrode being disposed along inner surfaces of the housing so as to surround the second electrode and the detection circuit for electromagnetically shielding against external electromagnetic noise.

3. An electrostatic sensor as claimed in claim 2; wherein the second electrode has a tubular configuration and is coaxial with the through-hole of the first electrode.

4. An electrostatic sensor as claimed in claim 3; wherein the second electrode is generally cylindrical-shaped.

5. An electrostatic sensor as claimed in claim 1; further including a case having a plurality of inner wall portions and containing therein the ground and sensor electrodes and the detecting circuit; and wherein the ground electrode is disposed along the inner wall portions of the case.

6. An electrostatic sensor as claimed in claim 1; further including a case containing therein the ground and sensor electrodes and the detecting circuit, the case having a first case member defining an enclosure having an open end and a second case member defining a cover for covering the open end of the first case member, each of the first and second case members having a through-hole coaxial with the through-hole of the ground electrode through which the body can pass.

7. An electrostatic sensor as claimed in claim 6; wherein the ground electrode comprises a first ground electrode portion integrally connected to a surface of the first case member, a second ground electrode portion integrally connected to an inner base surface of the first case member, and a plurality of third ground electrode portions integrally connected to inner wall portions of the first case member.

8. An electrostatic sensor as claimed in claim 7; wherein the first case member has a cylindrical portion having the through-hole through which the body can pass; and wherein the sensor electrode is integrally connected to an outer peripheral surface of the cylindrical portion of the first case member.

9. An electrostatic sensor as claimed in claim 1; further including a housing containing therein the ground and sensor electrodes and the detecting circuit; and wherein the ground electrode is disposed along inner surfaces of the housing so as to surround the sensor electrode and the detecting circuit for electromagnetically shielding against external electromagnetic noise.

10. An electrostatic sensor comprising: a housing having an internal cylindrical portion and having a through-hole for permitting the passage of an object therethrough; a ground electrode disposed in the housing; a sensor electrode having a generally cylindrical shape and being disposed in the housing over an outer peripheral surface of the cylindrical portion; and a detection circuit disposed in the housing for detecting the passage of the object through the through-hole based on a change in an electrostatic capacitance between the sensor electrode and the ground electrode; wherein the ground electrode is disposed along inner surfaces of the housing and surrounds the sensor electrode and the detection circuit for electromagnetically shielding against external electromagnetic noise.

11. An electrostatic sensor as claimed in claim 10; wherein the detection circuit is supported on a circuit board surrounded by the ground electrode.

12. An electrostatic sensor as claimed in claim 11; wherein the ground electrode has a case-like shape.

13. An electrostatic sensor as claimed in claim 12; wherein the housing comprises a first case member defining an enclosure having an open end, and a second case member defining a cover for covering the open end of the first case member.

14. An electrostatic sensor as claimed in claim 13; wherein the cylindrical portion of the housing is integral with the first case member.

15. An electrostatic sensor as claimed in claim 14; wherein the second case member has a through-hole through which the object can pass; and wherein when the second case member covers the open end of the first case member, the through-hole of the second case member is generally coaxial with the through-hole of the cylindrical portion of the first case member.

16. An electrostatic sensor as claimed in claim 10; wherein the ground electrode has a case-like shape.

* * * * *